United States Patent [19]

Wise

[11] Patent Number: 4,601,572

[45] Date of Patent: Jul. 22, 1986

[54] MICROFILMING SYSTEM WITH ZONE CONTROLLED ADAPTIVE LIGHTING

[75] Inventor: David S. Wise, Solon, Ohio

[73] Assignee: McGraw-Hill, Inc., New York, N.Y.

[21] Appl. No.: 721,205

[22] Filed: Apr. 9, 1985

[51] Int. Cl.$^4$ .................. G03B 27/74; G03B 27/80
[52] U.S. Cl. .................................. 355/68; 355/51; 355/65; 355/70
[58] Field of Search .................. 355/48, 51, 65, 66, 355/68, 69, 70

[56] References Cited

U.S. PATENT DOCUMENTS

| | | | |
|---|---|---|---|
| 3,279,312 | 10/1966 | Rogers, Jr. | 355/68 X |
| 3,479,119 | 11/1969 | Miller et al. | 355/68 X |
| 3,609,038 | 9/1971 | Koishorn | 355/68 |
| 3,936,186 | 2/1976 | Boland et al. | 355/68 X |
| 4,153,364 | 5/1979 | Suzuki et al. | 355/68 X |
| 4,265,532 | 5/1981 | McIntosh | 355/68 X |

Primary Examiner—Richard A. Wintercorn
Attorney, Agent, or Firm—Darby & Darby

[57] ABSTRACT

A system for producing images of documents is disclosed. The system provides varying levels of illumination to different areas of the document being recorded, depending upon relative image densities across the document. A slit aperture image area is divided into a plurality of illumination zones and the image density of each zone is sensed and adjusted individually. Efficient and orderly unattended off-loading of photographed documents is accomplished by a movable drawing member over which large documents are automatically draped, properly collated. A catch tray is provided for automatically off-loading and collating smaller documents.

10 Claims, 5 Drawing Figures

MICROFILMING SYSTEM WITH ZONE CONTROLLED ADAPTIVE LIGHTING

BACKGROUND OF THE INVENTION

1. Field of the Invention

This invention relates to a system for producing an image of a document and more particularly to a system which provides non-uniform illumination of the original document varying with the image density at different locations on the document.

2. Description of the Prior Art

Conventionally, images of large construction drawings are produced by utilizing a large planetary camera, which is well known in the art, such as in the case of microfilming. A drawing is placed on an illuminated table or easel and a frame of photosensitive material, such as film, is exposed through a timed shutter. The film may be advanced to the next frame and the next drawing to be microfilmed placed on the illuminated easel. Alternatively, a moving lens may be used to optically arrest the motion of documents traveling in a high speed stream for photographic exposure onto stationary, incrementally advanced photographic film, such as is shown in T. W. Howard, U.S. Pat. No. 4,374,618.

The density of the image produced on the photosensitive medium is related to the level of light reflected from the document being recorded. It is well known in the art that documents may be illuminated from either above or beneath, especially in the case of transparent or translucent originals. E. Hahn, et al., U.S. Pat. No. 3,947,112 shows the use of incandescent illumination from above the documents and fluorescent illumination from below. In current microfilming systems, a reflected light meter is customarily positioned above an area of a drawing that the photographer considers representative of the overall background density of the drawing. The overall illumination of the easel is then adjusted to produce the requisite average amount of reflected light at the area being measured, depending on such factors as film sensitivity, original document contrast, and image density.

Large construction drawings generally have severe variations in image density, due to the presence of both large open areas and areas having a predominance of fine line data. Thus, with prior art microfilm systems it is usually necessary to record the drawing on several film frames having different illumination levels in order to capture all the required detail. This makes the viewing of the information cumbersome to the user since he or she must use several frames to examine all areas of the drawing. This limitation further makes it difficult or impossible to print the entire drawing back from the microfilm since no single frame of microfilm contains an image of the entire drawing.

Another problem which has long prevented the efficient and smooth operation of high speed document recording and reproducing systems is the manner and extent to which the original documents must be handled. Large documents are generally laid flat on a table just prior to being fed into the image producing system. After being photographed, copied, or otherwise reproduced, the document generally emerges from output means of the machine, at which time it is usually again laid flat on a separate pile of completed documents. Such handling often results in torn or damaged documents, reduces the efficiency of a machine which otherwise might have a greater capacity for high speed document recording, and wastes a good deal of space around the imaging system, the wasted space being used only to pile up completed documents.

One aspect of this invention is based on the problem of highly variable image density on large format construction drawings. Another aspect of the invention is directed to improving handling of original documents after filming, also known as document off-loading.

OBJECTS OF THE INVENTION

Broadly, an object of this invention is to improve the quality and printability of recorded images of large format drawings, in view of the variable quality of source documents. In particular, an object is to provide a system for producing an image of a document which adjusts illumination of the source document in a non-uniform manner, according to the variation in graphic image density across the entire document.

Another object of the invention is to provide zone-controlled adaptive lighting for a document image producing system.

Another object is to provide zone-controlled adpative lighting for a document image producing system in which original documents are passed by a slit aperture in a high-speed stream.

Yet another object of this invention is to provide improved original document handling and off-loading in a high-speed document imaging system.

SUMMARY OF THE INVENTION

The objects of the present invention are achieved in a document imaging system employing zone-controlled adaptive lighting which controls the amount of illumination at a plurality of discrete regions of an original drawing. Since photosensitive media can generally only record image density variations over a relatively narrow range of illumination, the amount of illumination of each region of an original drawing is varied so as to produce a level of illumination that is within the acceptable range for the particular photosensitive medium being used. A rotary camera is described, having but not necessarily requiring as its basic elements means for moving a document, an adjustable slit aperture, zoom mirror assemblies, a lens, and film positioning means. Documents to be filmed may be provided with a base level of uniform illumination from above, below, or from both above and below the document. An optical image slit area created by the adjustable slit aperture is divided into a plurality of illumination zones over the entire length of the image slit area. The level of illumination at each individual illumination zone is separately controllable, according to the relative image density on the corresponding portion of an original document being microfilmed. After passing through the image producing system according to the present invention, original documents are automatically off-loaded onto storage means in a unique and highly efficient manner.

DESCRIPTION OF THE PREFERRED EMBODIMENTS

Figure 1:
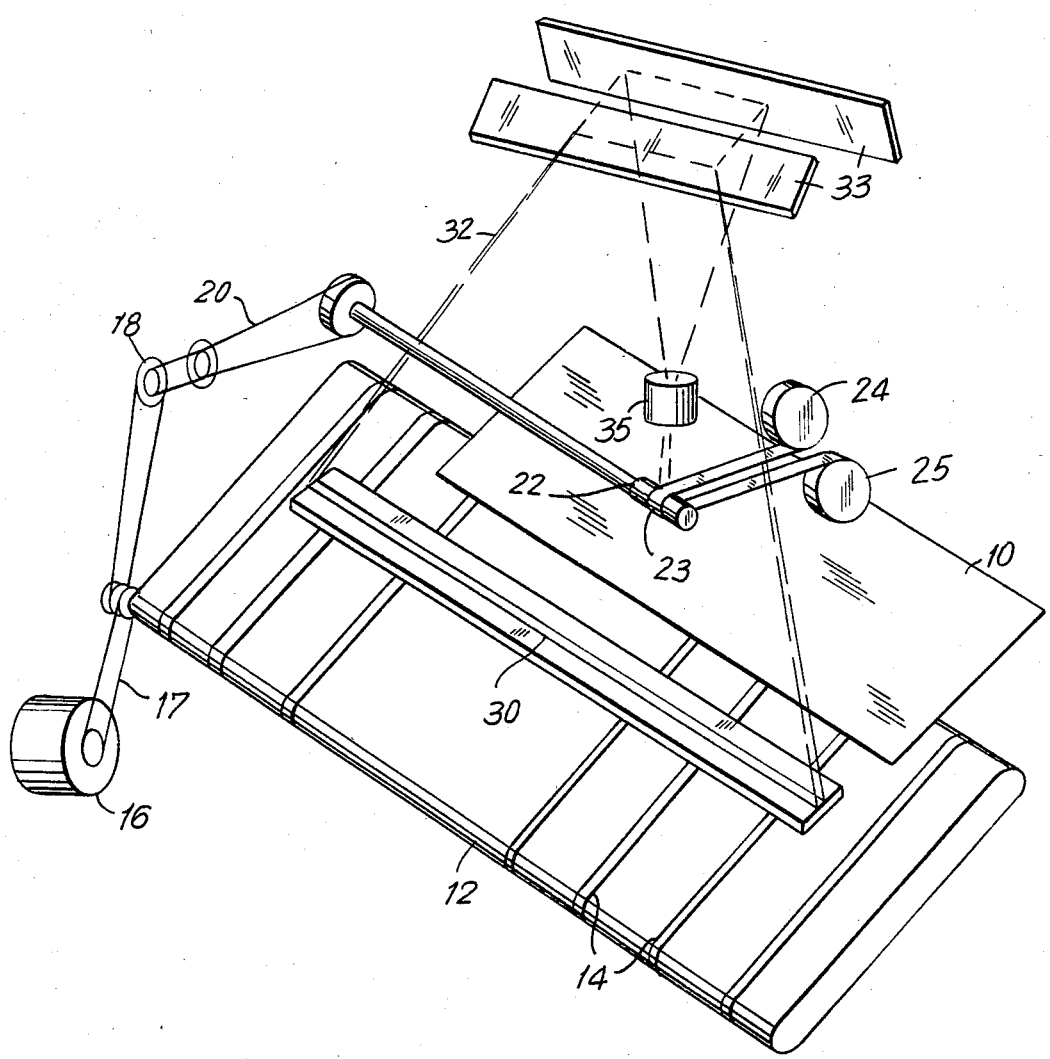
FIG. 1 is a perspective view of the elements of a basic rotary camera according to the present invention.

FIG. 1 shows the salient features of a rotary microfilming camera according to the present invention, to show a preferred environment for an adaptive lighting system. A drawing 10 to be microfilmed is conveyed by document moving means, which may include a plurality of belts 14, across a document retaining surface, in this case a vacuum table 12. The belts 14 are driven, in this illustrative embodiment, by a drive motor 16 operatively connected through a drive belt 17 to the belts 14 of the vacuum table 12. The drive motor 16 is additionally connected to selectable timing pullies 18, which may, in turn, drive a timing belt 20. The timing belt 20 further drives a capstan 22 around which a continuous strip of film 23 passes. The film 23 before passing around the capstan 22 is wound off of a supply reel 24, and afterwards is wound onto a take-up reel 25. It will be readily understood by those skilled in the art that many variations, substitutions, and modifications of this coupled drawing/ film driving arrangement are possible.

As the drawing 10 is drawn across the vacuum table 12, the drawing 10 passes between the table and an adjustable slit aperture means 30. By way of illumination to be described in detail below, a slit image cone 32 is formed. A zoom mirror assembly 33 may be used to fold and focus the slit image cone 32 through a lens 35 onto the aforementioned film capstan 22. In this way, optical reduction can be varied by adjusting the zoom mirror assembly 33 to change the conjugate length of the optical path. It will be apparent to those skilled in the art that the selectable timing pullies 18 may be selected to provide various divide ratios to coincide with a desired reduction ratio.

While rotary cameras are generally avoided for high speed document recording due to attendant high levels of vibration and problems with high speed synchronization, the inventor has found that with the use of precision mechanisms and careful alignment, synchronization, and focusing of optical components, a rotary camera arrangement according to the present invention can achieve better photographic results than the more widely accepted planatary cameras which are well known in the art.

In addition, the use of a rotary camera arrangement reduces the required optical circle of coverage. This results because the rotary camera lens arrangement is indifferent to the length of the document being photographed. On the other hand, a planatary camera lens arrangement must have an optical circle of coverage large enough to accommodate the longest diagonal distance of the document being photographed. For example, when a film format of 31.75 millimeters by 44.45 millimeters is used, the circle of coverage required for planatary photography is 72% larger than the circle of coverage utilized by the image slit with rotary photography. This results in substantial improvements in optical performance.

Figure 2:
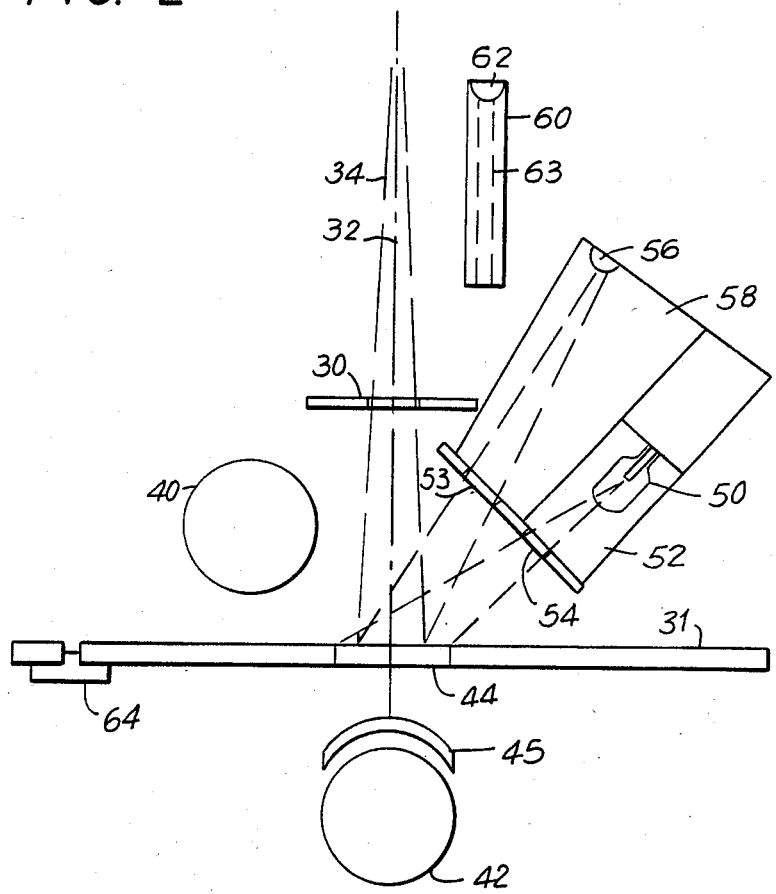
FIG. 2 is a cross-sectional view of the adaptive lighting features of the present invention.

Referring now to FIG. 2, features of one illustrative embodiment of an adaptive lighting system, suitable for use in a rotary camera microfilming system are shown. A slit image optical path 34 is defined along an optical center line 32 by slit image aperture means 30, which may be adjustable. The slit image aperture means 30 is preferably located as close as possible to the object plane 31 which is spaced at the level at which a document passes by the slit aperture means 30. The field of view of the slit image optical path 34 is limited to reflection only of the object plane 31 (i.e., no direct view of any illumination source). Satisfactory results are obtainable with the slit image aperture means 30 adjusted to have a width in the range of 0.100 to 0.500 inches, with a nominal value of 0.200 inches. The lower limit is roughly defined by the smallest width aperture for which minor fluctuations aperture means 30 are still not readily noticeable. The upper limit of 0.500 inches is chosen to correspond with the particular diameter, in this embodiment, of the zone reflectance integration area 72, of FIG. 3, to be more fully described below.

A base level of controlled uniform illumination of the object plane 31 over the entire length of the slit image aperture means 30 may be provided by, for example, a fluorescent lamp 40 located between the aperture 30 and the object plan 31 adjacent to, but out of direct view of the slit image optical path 34, so as to illuminate the surface of the document 10 facing the slit aperture means 30. Alternatively, or additionally, certain documents may require additional sub-illumination, such as mylar drawings. A base level of controllable uniform sub-illumination of the object plane 31 over the entire length of the slit image aperture 30 may be provided by, for example, a second fluorescent lamp 42 located below the object plane 31, through a sub-light window 44, so as to illuminate the surface of the document 10 facing away from slit aperture means 30. When not required, this illumination source may be blocked out by a sub-light shutter 45.

Figure 3:
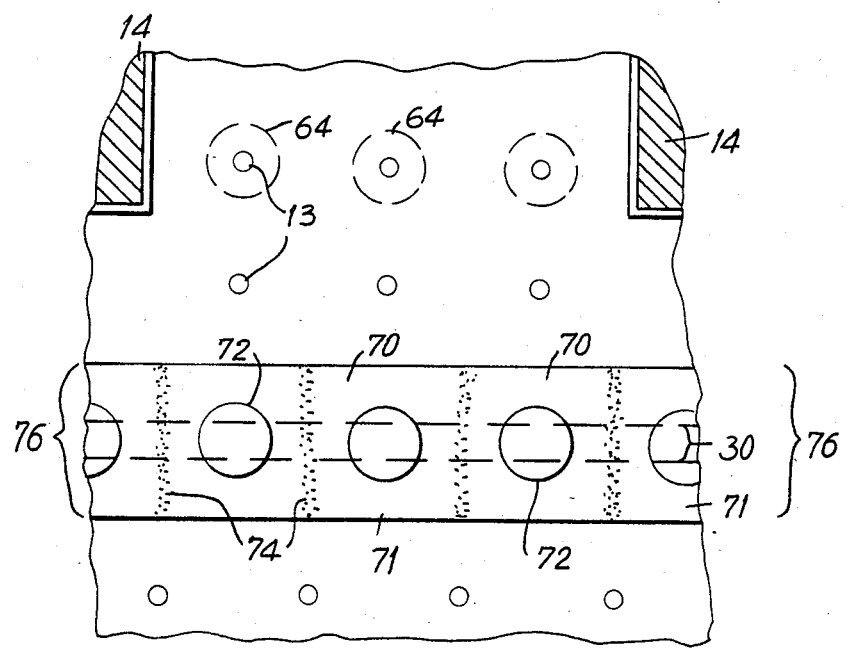
FIG. 3 is a plan view of the document vacuum table according to the present invention.

Referring briefly to FIG. 3, there is shown a slit image area 76 which is divided into a plurality of illumination zones 71 along its length. Now referring back to FIG. 2, it will be understood that a halogen lamp/photo diode arrangement described below is provided for each and every illumination zone 71. Each illumination zone 71 has a separate illumination source which may be a quartz halogen lamp 50 for zone illumination. The halogen lamp 50 is located between the slit image aperture 30 and the object plane 31 adjacent to, but out of direct view of the slit image optical path 34. Each quartz halogen lamp 50 is located in a separate lamp compartment 52 and projects a beam of light through an opening in a zone merge mask means 54. The pattern of illumination at the object plane 31 for each illumination zone 71 is controlled by the shape and location of the zone merge mask means 54 to produce a slightly overlapping vignetted edge which results in a soft merge between adjacent zones. FIG. 3 shows the separate zone illumination areas 70 along with the soft merge regions 74 between illumination zones 71. The particular illustrative embodiment presently described utilizes one inch wide illumination zones.

Again referring to FIG. 2, the level of reflected light within each illumination zone 71 of the slit image area 76 is monitored by control means responsive to image density variations along the slit image area 76. The control means may include a plurality of photo diodes 56 which have been color corrected to match the panchromatic spectral response of the medium being used. Each eye corrected photo diode 56 may be mounted at one end of a separate zone sensor dark compartment 58 so as to view the object plane 31 at the optical center of the slit image area 76 in the center of its zone 71 through a hole in the zone integration mask means 53. The size of the hole in the zone integration mask means 53 is controlled to create a finite zone reflectance integration area 72 at the center of the illumination zone 71. The present embodiment utilizes a one-half inch diameter circular zone reflectance integration area.

In order to assure the proper relationship of the zone merge mask means 54 and the zone integration mask means 53 within the illumination zones 71 and furthermore, the relationship of these masks across the plurality of zones 71 throughout the slit image area 76, the present embodiment utilizes a single precision mask that covers the entire length of the image slit (45 illumination zones).

For calibration and testing purposes, the adaptive lighting system is provided with a master reflectance probe means 60 comprising, in this case, a color corrected photo diode 62 mounted at the end of a viewing tube 63. This probe means 60 is controllably movable along the entire length of the slit aperture means 30 and provides for independent measurement of the level of reflected light at the object plane 31 at any point along the slit image area 76 by inserting the probe 60 into the aperture means 30 along the optical axis 32 and transporting it along the slit image aperture 30 to the desired position. The geometry of the viewing tube 63 and its height above the object plane 31 are controlled to create a finite circular zone reflectance integration area along the optical center of the slit image area 76. This illustrative embodiment utilizes a one-half inch diameter circle of integration, which corresponds to the zone reflectance integration area 72 sensed by photo diode 56.

The presence of a document within an illumination zone 71 is determined by vacuum sensing means 64 which may be vacuum activated switches, mounted on the table 12 at each zone edge. Conventional optical interruption devices cannot be used in view of translucent documents, such as vellum or mylar. Conventional optical reflectance cannot be used in view of the possibility of dense information on the documents. When an adjacent in-line zone edge detector 64 is bridged by a document, the vacuum switch may activate, indicating the presence of the document. This illustrative embodiment utilizes forty-six zone edge detectors.

In order to obtain the maximum benefit from the adaptive lighting system of the present invention, lighting levels must be initialized to the sensitometry and chemistry of the particular photosensitive medium being used and then each of the illumination zones must be equalized through a calibration process. In these processes, the master probe means 60 is used as a transfer standard. A preferred, but nonetheless illustrative, initialization procedure is as follows. A highly reflective source document (white paper) is inserted in the slit image area 76 of the object plane 31. With the master reflectance probe 60 positioned near the center of the slit image area 76, voltage levels supplied to the uniform lighting source (flourescent lamp 44, flourescent lamp 42) required to produce incremental reference levels of the master reflectance probe 60 are recorded. After removing the probe 60 and setting the slit image aperture means 30 to its nominal dimension, in this case 0.200 inches, the white paper source document is then repeatedly photographed with the uniform light source 40 at the various recorded levels. The resulting image densities are then measured on the processed film. By repeating this procedure, a master probe reference level required to produce a specific white paper image density is determined. In this particular embodiment, the white paper processed density is assigned the value 1.00, and the master probe reference level is monitored by a computer through an eight bit A/D converter, which is well known to those skilled in the art. Additionally, the voltage input to the uniform light source is controlled by the same computer through an eight bit D/A converter, which is also well known to those skilled in the art. This initialization process is performed on installation of the adaptive lighting system and is not normally repeated.

A feature of this invention is that the level of reflected light is monitored and controlled independently in each illumination zone 71. In order to produce a uniform image, all zone sensor means 56 must control at substantially identical levels of reflected light. To assure this, a zone sensitivity calibration should be performed periodically as follows. A highly reflective source document (white paper) is inserted in the slit image area 76 of the object plane 31, with the master probe 60 positioned over the center of the slit image area 76 and then at the center of each individual zone 71, successively. The uniform light source 40 is adjusted until the master probe 60 reaches its reference level. At this point the zone reflectance sensor level from photo diode 56 is recorded as the reference level for that particular zone. This process is repeated for each illumination zone 71. In this way a separate zone sensor reference level for each zone is determined representing an identical level of reflected light for each zone. In the present illustrative embodiment, the zone sensor levels are monitored and recorded by a computer through eight bit A/D converters, and the master probe reference level is monitored by the computer through an eight bit A/D converter. The voltage input to the uniform light source is controlled by the computer through an eight bit D/A converter. Furthermore, the master probe 60 is positioned sequentially to the center of each illumination zone 71 by the computer through a stepping motor and transport cable arrangement. This calibration routine takes approximately one minute to perform and is implemented at least once a day, automatically during the system warm-up cycle.

Operation of the zone controlled adaptive lighting system is as follows. A source document 10 is drawn across the vacuum table 12 by driving belts 14 toward the slit image area 76. The zone edge detectors 64 are used to locate the leading edge, trailing edge, and determine the width of the document in terms of completely covered zones. Since documents are transported at a fixed speed by belts 14, positions of leading and trailing edges can be determined throughout the various stages of system operation.

As the leading edge of a document approaches the slit image area 76, a film transport clutch (not shown) may be activated sufficiently in advance of the presence of the document image to assure linear film motion. Additionally, an optional capping shutter (not shown) may be removed from the optical path 34 coincident with the appearance of the document 10 in the slit image area 76. These actions would be reversed as the trailing edge exits the slit image area 76.

As the leading edge of the document 10 enters the slit image area 76, the uniform light source 40 is held at the approximate level used in the last calibration to satisfy the master probe reference level with a highly reflective source document (white paper). When the leading edge of the document 10 has advanced past the optical center so as to fill the slit image area 76 with document the adaptive lighting process is initiated, this process being limited to zones that are determined through the edge sensors 64 to be active.

Zone illumination may be added to the uniform illumination level as necessary to maintain each zone reflectance sensor 56 at its independent reference level. Alternatively, uniform base illumination may be added to the controlled adaptive zone illumination. Thus as the background density of the source document 10 changes in each active zone, the level of illumination is altered to produce a uniform image density on the processed film. In this illustrative embodiment, this control is performed by a computer. The level of each zone reflectance sensor 56 is polled by the computer by time-shared A/D converters. These polled levels are compared with the individual zone reflectance refence levels to control the zone illumination lamps 50. If the polled zone reflectance level is below the reference level for that zone, and the zone is active, the respective zone illumination lamp 50 is kept "on". If the polled zone reflectance level is above the reference level for that zone, or if the zone is not active, the zone illumination lamp is kept "off". This results in a variable duty cycle power source to each lamp 50 which is integrated to become a variable illumination level by the thermal properties of the lamp. The effective polling period in this illustrative embodiment is approximately 2 milliseconds.

If the merged zone lighting is used alone, the photographic image of a source document with uniform background density may be deteriorated asthetically by the introduction of a striped pattern at the points of merging of the zones even though there is no loss of information and the resultant image is uniform in density. By optically adding a base level of uniform lighting, the zone control mechanism automatically reduces a proportion of zone lighting required to hold each zone reflectance to its reference level which consequently reduces the zone merge striping detectable on the uniform density documents.

As the document proceeds, the level of zone lighting in the active zones is continuously evaluated. Accordingly, the level of uniform lighting is gradually adjusted as necessary to minimize the overall duty cycle for the individual zone illumination lamps, while assuring that the zone sensing means remain in control. This provides for the maximum proportion of uniform lighting consistent with the overall background density of the document. As the trailing edge of the document enters the slit image area 76, the adaptive lighting control is terminated and the uniform lighting is abruptly returned to its most recent calibration level.

In the case of translucent source documents, such as vellum or mylar, the normal dark surface of the object plane 31 bleeds through the translucent source document 10, reducing the contrast of the image. With this type of source document, a uniform sub-light is used to restore the contrast. When the sub-light function is activated, the sub-light shutter 45 is retracted and the uniform sub-light 42 illuminates the underside of the object plane 31 through the sub-light window 44. With the level of sub-light adjusted to satisfy the master probe reference level, the slit image area 76 appears white where there is no source document. Under adaptive lighting control, the addition of uniform sub-illumination should be limited to a level low enough so as not to constitute transmitted illumination.

The zone controlled adaptive lighting system thus described provides for the successful recording of images onto microfilm over a substantially broadened range of background densities.

Figure 4A:
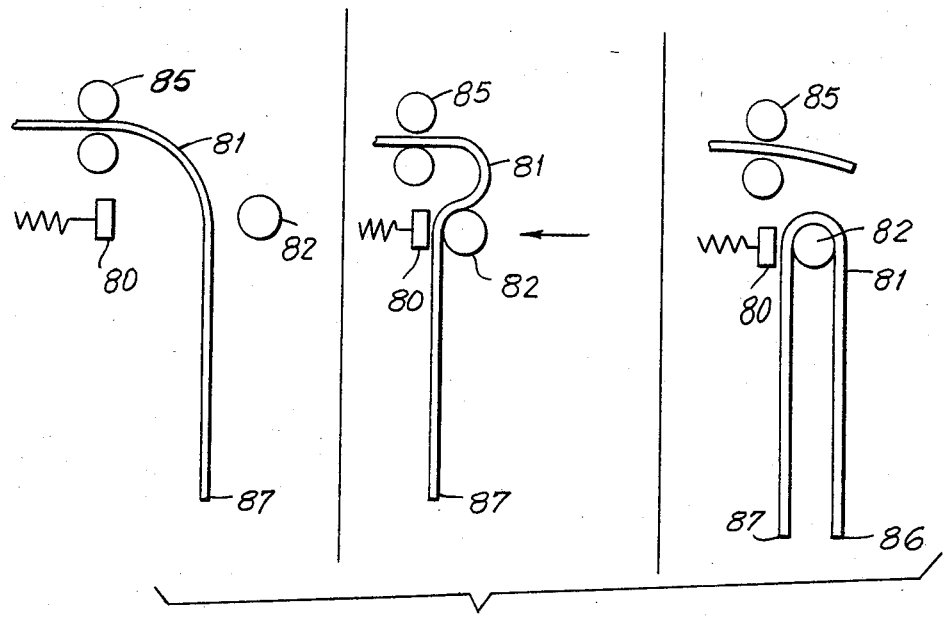
FIGS. 4a and 4b show document off-loading according to the present invention.

Referring now to FIG. 4a, features of the invention are shown for unattended off-loading of source documents in a neat and orderly fashion, in the same order that the source documents were entered into the document recording system. In this way documents may be simply refastened and passed on to their next destination. FIG. 4a shows an arrangement useful for long drawings. The off-loading apparatus comprises a resilient pressing member, for example, a horizontally spring loaded pressure plate 80, located approximately below the output means 85 from the document recording device, which may be a pair of opposed rollers. A horizontally movable elongate member or drawing bar 82 is spaced away from and opposed to the spring loaded pressure plate 80. The height of the top of drawing bar 82 should be at least half the length of the longest drawings expected to be off-loaded from the document recording system.

FIG. 4a shows the off-loading apparatus in its various steps of operation. In the first illustration, drawings 81 are seen draped over the drawing bar 82. In addition, a long drawing 81 is shown as emerging from the rollers of the rotary camera output 85. When the emerging document 81 has fed out of the camera system sufficiently so that its approximate center is at the same height above the floor as the drawing bar 82, drawing bar 82 is moved towards the spring loaded pressure plate 80 until the drawing 81 is caught between and held in place by the bar 82 and the plate 80. The drawing 81 continues to emerge from between the rollers 85, and as the free end 86 of the document 81 emerges, it simply drapes over the far side of the drawing bar 82. In this way documents which are fed into the camera system face up and in a sequential order, are "stacked" during off-loading in the same sequential order. The drawing bar 82 is then moved away from the pressure plate 80 back to its first position and another document begins to emerge from between the output rollers 85.

Figure 4B:
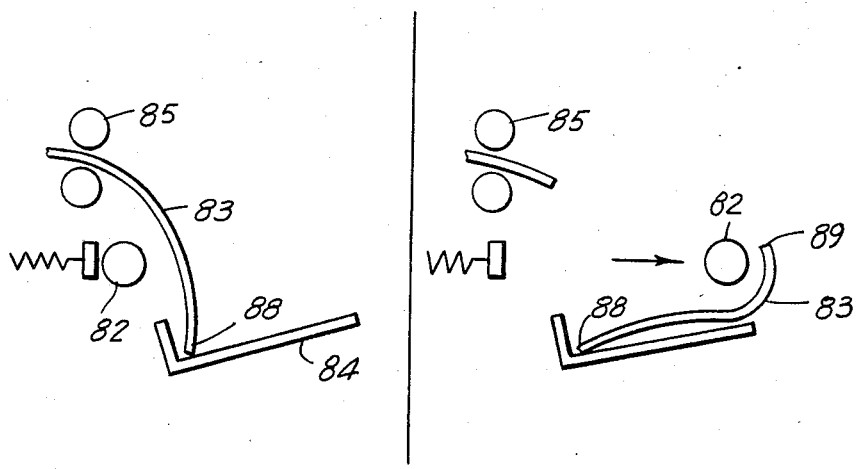

Referring now to FIG. 4b, the off-loading arrangement for short documents is shown. Again output rollers 85, pressure plate 80, and drawing bar 82 are shown. In addition, document receiving means in the form of a catch tray 84 is employed. In its first position, drawing bar 82 is located adjacent to the pressure plate 80. As a short drawing 83 emerges from between the rollers 85 its leading edge 88 falls into the near corner of the catch tray 84. As the trailing edge 89 of the document emerges from between the rollers 85, the drawing bar 82 is used to catch the falling portion of the document and to lay it flat in the catch tray as shown. The drawing bar is then retracted to its first position and another document begins to emerge from between the rollers. As before, this unique and efficient off-loading system neatly stacks the documents in the same order in which they were fed into the microfilming system.

It will be understood that the above-described illustrative embodiment is only one preferred example of aspects of the present invention. Numerous additions, substitutions, and modifications are possible without departing from the scope or spirit of this invention, limited only by the appended claims.

I claim:

1. A system for producing an image of a document on a photosensitive medium comprising:
   slit aperture means for providing a slit image area on said document;

means for moving said document with respect to said slit aperture means;

control means responsive to image density vairations along said slit image area for generating a plurality of illumination control signals, each related to the image density in a predefined respective zone on said document along said slit image area; and a plurality of sources of illumination, each responsive to at least one of said control signals for illuminating the respective zone thereof in relationship to the control signal.

2. The image producing system of claim 1 wherein said photosensitive medium is photographic film.

3. The image producing system of claim 2 further comprising:

film drive means operating coupled to said document moving means for advancing said photographic film; and optical means for focusing an image of said slit image area of said document through said slit aperture means onto said photographic film.

4. The image producing system of claim 1 wherein said moving means includes:

a document retaining table mounted in spaced relationship from said slit aperture means; and at least one document transport belt at a surface of said table.

5. The image producing system of claim 4 wherein said document retaining table has a plurality of vacuum holes for retaining said document, said table further including a plurality of vacuum sensing means for detecting the presence of a document on said table.

6. The image producing system of claim 1, further comprising:

a first uniform illumination means for controllably and uniformly illuminating said document along the entire length of said slit image area, said first uniform illumination means mounted in a spaced relationship from said document moving means so as to illuminate the surface of said document facing said slit aperture means.

7. The image producing system of claim 6, further comprising:

a second uniform illumination means for controllably and uniformly illuminating said document along the entire length of said slit image area, said second uniform illumination means mounted in a spaced relationship from said document moving means so as to illuminate the surface of said document facing away from said slit aperture means.

8. A system for producing an image of a document comprising:

slit aperture means for providing a slit image area on said document;

means for moving said document with respect to said slit aperture means;

a plurality of respective zone illumination sources spaced at a predetermined relationship to said slit image area;

zone merge means disposed between each zone illumination source and said slit image area for merging illumination of adjacent zone illumination sources into a substantially continuous illumination pattern;

a plurality of zone illumination sensing means responsive to document image density variations along said slit image area for controlling each respective zone illumination source; and zone integration mask means disposed between said slit image area and said zone illumination sensing means, for defining a plurality of respective sensing zones in said slit image area along the length of said slit image aperture.

9. The image producing system of claim 8 further comprising:

probe means controllably movable along the entire length of said slit aperture means for sensing illumination variations along the entire length of said slit image area.

10. The image producing system of claim 9 wherein:

each said zone illumination source comprises a quartz halogen lamp; and each said zone illumination sensing means comprises a color corrected photo diode.

* * * * *